(12) United States Patent
Anderson

(10) Patent No.: US 10,377,042 B2
(45) Date of Patent: Aug. 13, 2019

(54) VISION-BASED ROBOT CONTROL SYSTEM

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 15/185,241

(22) Filed: Jun. 17, 2016

(65) Prior Publication Data
US 2017/0361466 A1    Dec. 21, 2017

(51) Int. Cl.
*G01C 21/00* (2006.01)
*B25J 9/16* (2006.01)

(52) U.S. Cl.
CPC .................. *B25J 9/1697* (2013.01)

(58) Field of Classification Search
CPC ....................................................... B25J 9/1697
See application file for complete search history.

(56) References Cited

U.S. PATENT DOCUMENTS

| | | |
|---|---|---|
| 2003/0138130 A1 | 7/2003 | Cohen |
| 2008/0085048 A1 | 4/2008 | Venetsky et al. |
| 2010/0103106 A1* | 4/2010 | Chui ................. G06F 3/017 345/166 |
| 2015/0032260 A1 | 1/2015 | Yoon et al. |
| 2016/0041628 A1* | 2/2016 | Verma ............... G06F 3/0304 345/156 |
| 2016/0154996 A1 | 6/2016 | Shin et al. |
| 2017/0238129 A1* | 8/2017 | Maier ................. H04W 4/02 455/404.2 |

FOREIGN PATENT DOCUMENTS

| | | |
|---|---|---|
| KR | 20120116278 | 10/2012 |
| WO | 2017218084 | 12/2017 |

OTHER PUBLICATIONS

"International Application Serial No. PCT US2017 030358, International Search Report dated Sep. 18, 2017", 3 pgs.
"International Application Serial No. PCT US2017 030358, Written Opinion dated Sep. 18, 2017", 9 pgs.

* cited by examiner

*Primary Examiner* — Ian Jen
(74) *Attorney, Agent, or Firm* — Schwegman Lundberg & Woessner, P.A.

(57) ABSTRACT

Various systems and methods for providing a vision-based robot control system are provided herein. A vision-based robot control system comprises a camera system interface to receive image data from a camera system; a trigger detection unit to determine a triggering action from the image data; and a transceiver to initiate a robot operation associated with the triggering action.

25 Claims, 4 Drawing Sheets

VISION-BASED ROBOT CONTROL SYSTEM

TECHNICAL FIELD

Embodiments described herein generally relate to robotic controls and in particular, to a vision-based robot control system.

BACKGROUND

Robots are mechanical or electro-mechanical machines able to act as agents for human operators. Some robots are automated or semi-automated and able to perform tasks with minimal human input. Robots are used in residential, industrial, and commercial settings. As electronics and manufacturing processes scale, robot use is becoming more widespread.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Disclosed herein are systems and methods that provide a vision-based robot control system. Consumer-level robots are becoming a reality with lower cost manufacturing and more affordable electronics. Robots may include various sensors to detect their environment. Example sensors include proximity sensors, position sensors, impact sensors, and cameras or other image-based sensors. While some robots are able to be controlled using buttons on an exterior housing, with remote control devices, or with auxiliary controls, such as controls at a charging station, what is needed are more intuitive ways to control robots.

Figure 1:
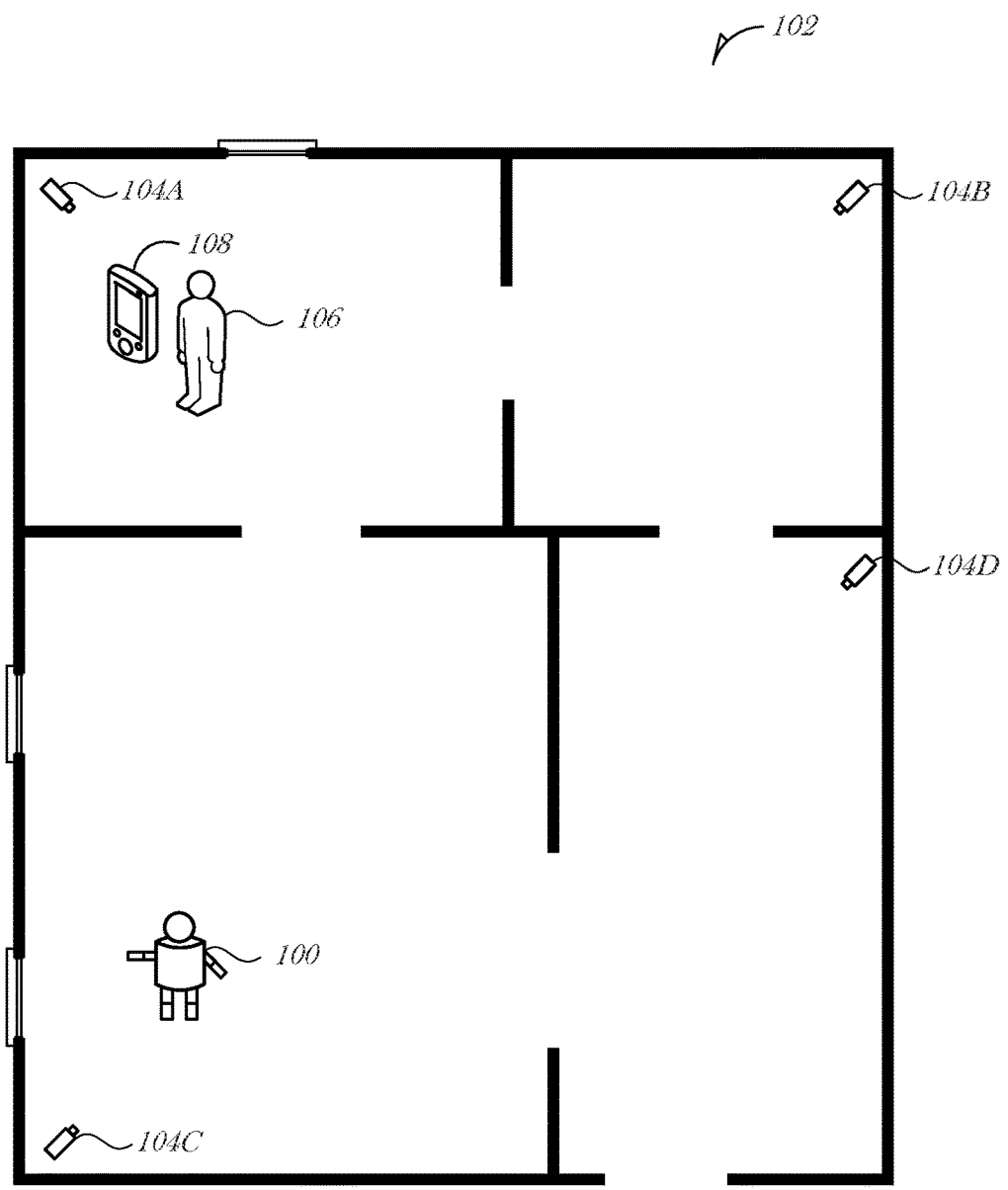
FIG. 1 is a diagram illustrating a robot operating in an environment, according to an embodiment.

FIG. 1 is a diagram illustrating a robot 100 operating in an environment 102, according to an embodiment. The robot 100 may be any type of self-propelled, mobile machine. The robot 100 may use various apparatus to move, such as wheels, treads, tracks, or the like. The robot 100 may also implement one or more legs to hop, walk, crawl, or otherwise move (e.g., fly) about an environment. The robot 100 may include an onboard camera system, which may include one or more cameras. The camera system may include a visual light camera (e.g., an RGB camera), an infrared (IR) light camera, or other cameras. The IR camera may be used for night vision, as a depth camera, or thermal imagery. In addition to a camera system, the robot 100 may also be equipped with other sensors, such as a sonar system, radar system, etc. to navigate environments. The robot 100 also includes one or more communication systems, which may include a wireless networking communication system. The wireless networking communication system may use one or more of a variety of protocols or technologies, including Wi-Fi, 3G, and 4G LTE/LTE-A, WiMAX networks, Bluetooth, near field communication (NFC), or the like.

Alternatively, the robot 100 may interface with one or more cameras 104A, 104B, 104C, 104D (collectively referred to as 104). The cameras 104 may capture a user's movement, actions, or other aspects of the user 106 as the user 106 moves about in the environment 102. Cameras 104 in the environment 100 may include visible light cameras, infrared cameras, or other types of cameras. The cameras 104 may be connected using wired or wireless connections. In addition, one or more of the cameras 104 may use one or more servos for pan and tilt to follow a subject while it is within the operating field of view of the camera 104. The camera 104 may track a subject using shape recognition or with a physical marker that the subject holds or wears and the camera 104 actively tracks. The physical marker may be wireless connected to the camera 104 using a technology such as Bluetooth. Although only four cameras 104 are illustrated in FIG. 1, it is understood that more or fewer cameras may be implemented based on the size of the environment, obstructions in the environment, or other considerations. Combinations of onboard cameras and environmental cameras may be used.

The user 106 may interface with the robot 100 using various intuitive techniques. In an aspect, the user 106 gestures in a particular manner, which may then be captured by the cameras 104 or the robot 100, or by other environmental sensors. The gesture may provide instruction to the robot 100 based on a preconfigured association. For instance, the user 106 may mark a spot on the floor by tapping his foot in a prescribed manner. The robot 100 may be a cleaning robot, such as semi-automated vacuum. The tapping may be detected by the user's motion using cameras 104, by sound processing (e.g., using a microphone array), by vibration (e.g., by using in-floor sensors to detect vibration location), or by other mechanisms or combinations of mechanisms. After receiving an indication of the gesture performed by the user 106, the robot 100 may concentrate in the area indicated by the gesture, such as by performing extra passes or by temporarily slowing down to clean the area more thoroughly.

It is understood that while some embodiments discussed in this disclosure include camera and image processing, other modalities of gesture detect may be used instead of, or in combination with, camera and image processing techniques. Thus, gesture detection is used to identify a particular location to perform a robotic action, and as such, in some cases, the gesture is used to intuitively identify the location (e.g., pointing to a spot on the floor, motioning to an area, or tapping the floor with a foot, etc.).

In another aspect, the user 106 may provide instructions using a marker with an infrared-detectable ink. The ink is not visible to human eyes, so it does not discolor or mar materials, such as carpet or furniture upholstery. The robot 100 may be configured with an IR camera, or the environmental camera 104 may be an IR camera, which is able to see the markings left by the user 106. Different markings may be used, such as a box to indicate an extra clean, a circle to instruct the robot 100 to use a different cleaner, or an "X" to avoid an area. Other markings may be used. In another aspect, the robot 100 may clean the IR-detectable ink when cleaning the marked area. As such, the ink marking may act as a one-time instruction. Alternatively, the IR-ink may be left behind purposefully, so that the mark is able to be observed on subsequent cleanings.

In addition to visual ques, the user 106 may also provide instruction with other modalities, such as verbally or with geolocation. In an example, the user 106 may gesture and then speak a verbal command, which is received at the robot 100 and then acted upon by the robot 100. For instance, the user 106 may point to a spot on the floor with a laser pointer and speak "move the shelf over here." The robot 100 may directly receive such commands with an onboard camera system and a microphone. Alternatively, environmental sensors, such as cameras 104 and microphones, may detect the user's actions and communicate them as commands to the robot 100. Upon receiving an actionable instruction, the robot 100 may move to the shelf, lift it, and then move it to the location indicated by the user's gesture.

In another aspect, the user 106 may use a geolocation as an additional input. For instance, the user 106 may use a mobile device 108 (e.g., smartphone, tablet, wearable device, etc.) and perform a gesture while holding or wearing the mobile device. The user 106 may also initiate verbal commands to the mobile device. The location of the mobile device 108 (e.g., geolocation) may be obtained and transmitted to the robot 100 along with an instruction, as defined by the gesture or verbal instruction provided by the user 106.

Figure 2:
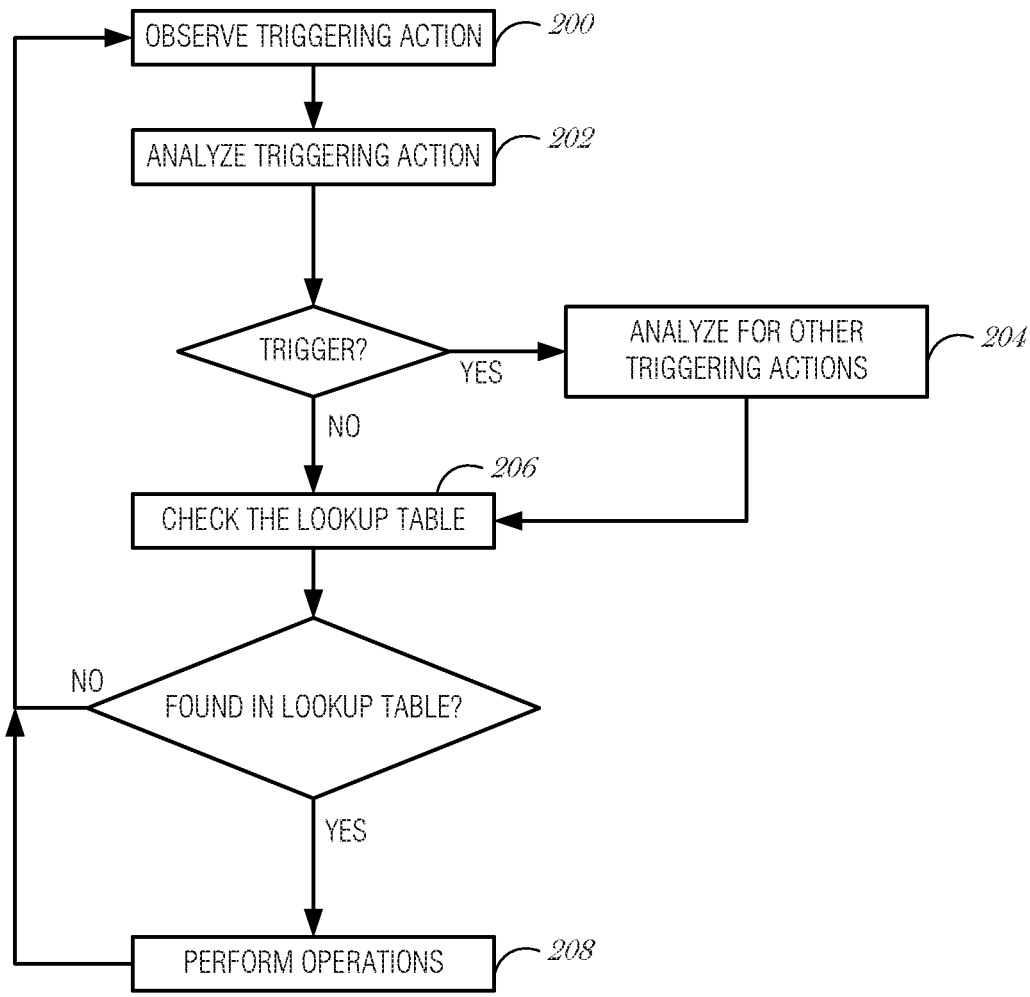
FIG. 2 is a flowchart illustrating the data and control flow, according to an embodiment.

FIG. 2 is a flowchart illustrating the data and control flow, according to an embodiment. A triggering action performed by a user is observed by a camera system (operation 200). For instance, a user may perform a gesture or leave a mark visible to the robot (e.g., with a token or with an ink visible to the camera system that may or may not be visible to unaided humans) The camera system interprets the action (operation 202). The interpretation may include gesture recognition, pattern recognition, shape recognition, or other forms of analysis to determine the type of triggering action performed by the user. If the triggering action is recognized, then additional processing may occur to determine whether the user provided any other triggering commands (operation 204), such as a verbal command. If a verbal command is recognized, for example, then the verbal command may be parsed and used in the subsequent operations. Additionally, geolocations, locations of pointing gestures, or other commands, may be analyzed at operation 204.

A lookup table is referenced (operation 206) to determine which operation the robot is to perform based on the trigger input. The types of trigger input and resulting robot operations may differ according to the design and function of the robot. For example, a cleaning robot may be programmed to respond to certain triggering actions, where a security robot may be programmed to respond to other triggering actions. In the case where several robots operate in the same environment, the user may map the triggering actions to only trigger one of several robots. Alternatively, the user may configure the commands such that a single command may cause multiple robots to perform certain functions.

If the triggering actions map to an action found in the lookup table, then the robot is scheduled to perform the resulting operation (operation 208). The robot may perform the operation immediately or may be configured to perform the operation at the next duty cycle (e.g., the next cleaning cycle).

If the triggering actions are not found in the lookup table, then the control flow returns to operation 200, where the system monitors for additional user triggering actions.

Figure 3:
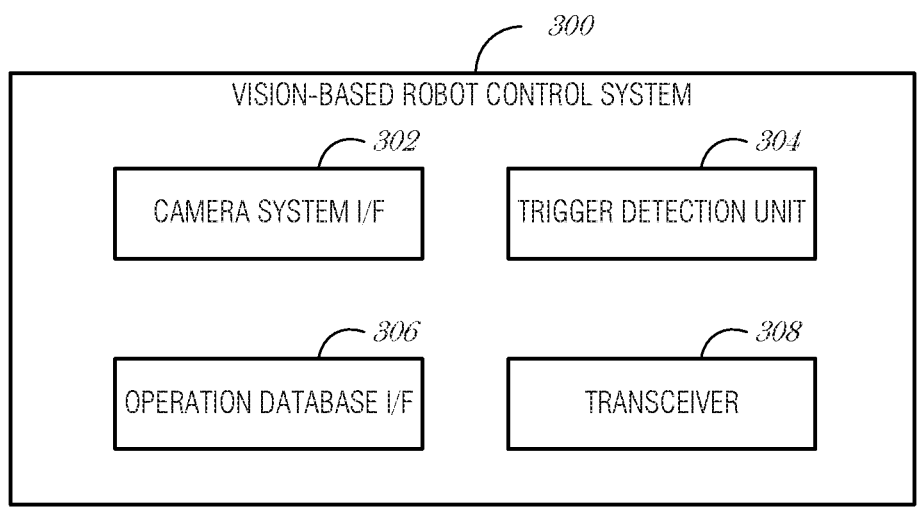
FIG. 3 is a block diagram illustrating a vision-based robot control system for controlling a robot, according to an embodiment.

FIG. 3 is a block diagram illustrating a vision-based robot control system 300 for controlling a robot, according to an embodiment. The system 300 may be installed in a robot. Alternatively, the system 300 may be separate from a robot, but communicatively coupled to the robot in order provide control signals. The system 300 includes a camera system interface 302, a trigger detection unit 304, an operation database interface 306, and a transceiver 308.

The camera system interface 302, trigger detection unit 304, operation database interface 306, and transceiver 308 are understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entities may be constructed using one or more circuits, such as with dedicated hardware (e.g., field programmable gate arrays (FPGAs), logic gates, graphics processing unit (GPU), a digital signal processor (DSP), etc.). As such, the tangible entities described herein may be referred to as circuits, circuitry, processor units, subsystems, or the like.

The camera system interface 302 may receive camera signal information from a camera array, which may be installed on the system 300 or be remote, but communicatively coupled to the system 300. For instance, the camera system interface 302 may receive raw video signal information or processed signal information (e.g., compressed video signals). In another aspect, the camera system interface 302 may be used to receive tagged information from a camera array, which analyzed and preprocessed the raw video signal at, or near, the camera array.

Trigger detection unit 304 is capable of analyzing image or video data received by the camera system interface 302, and detect and identify a gesture exhibited by movements performed by a person in the image or video data. The trigger detection unit 304 determines whether the movements constitute a recognized gesture. If the movements do constitute a recognized gesture, the trigger detection unit 304 may trigger operations performed by a robot.

To detect the gesture, the trigger detection unit 304 may access image data of an arm, finger, foot, or hand motion of a user captured by a camera system, and identify the gesture based on the image data. The image data may be a number of successive images (e.g., video) over which the gesture is performed.

In another aspect, the trigger detection unit 304 accesses depth image data of an arm, finger, foot or hand motion of the user and identifies the gesture based on the depth image data. The depth image data may be a number of successive images (e.g., video) over which the gesture is performed.

In another aspect, the trigger detection unit 304 operates independent from the camera system interface 302, and receives information or data that indicates a gesture via a different pathway. For example, in an aspect, to detect the selection gesture, the trigger detection unit 304 is to access motion data from an auxiliary device, the motion data describing an arm, finger, foot, or hand motion of the user and identify the gesture based on the motion data. The auxiliary device may be a mobile device, such as a smartphone, a wearable device, such as a smartwatch or a glove, or other type of device moveable by the user in free space.

Examples include, but are not limited to, smartphones, smartwatches, e-textiles (e.g., shirts, gloves, pants, shoes, etc.), smart bracelets, smart rings, or the like.

The operation database interface 306 is used to determine whether the gesture is detected and recognized as being a triggering gesture. If it is a recognized triggering gesture, then commands are transmitted to a robot using the transceiver 308. The transceiver 308 may be configured to transmit over various wireless networks, such as a Wi-Fi network (e.g., according to the IEEE 802.11 family of standards), cellular network, such as a network designed according to the Long-Term Evolution (LTE), LTE-Advanced, 5G or Global System for Mobile Communications (GSM) families of standards, or the like. When the system 300 is incorporated into a robot, then the commands may be directly communicated to a robot controller by way of a wired connection.

Thus, the system 300 describes a vision-based robot control system, the system 300 comprising the camera system interface 302, the trigger detection unit 304, and the transceiver 308. The camera system interface 302 may be configured to receive image data from a camera system/

The trigger detection unit 304 may be configured to determine a triggering action from the image data.

The transceiver 308 may be configured to initiate a robot operation associated with the triggering action. In an embodiment, to initiate the robot operation, the transceiver 308 is to transmit a command sequence to a robot over a wireless network. In an embodiment, the robot operation comprises a cleaning task.

In an embodiment, to receive the image data, the camera system interface 302 is to receive an image of a user performing a gesture. In such an embodiment, to determine the triggering action, the trigger detection unit 304 is to determine the triggering action corresponding to the gesture. In an embodiment, the gesture comprises pointing to a location in an environment. In an embodiment, the gesture comprises tapping a foot on a location in an environment. In an embodiment, the triggering action is the gesture and the robot operation comprises performing extra cleaning at the location in the environment.

In an embodiment, the image data includes a gesture performed by a user, and the trigger detection unit 304 is to receive a voice command issued by the user and determine the triggering action using the gesture and the voice command. In a further embodiment, the gesture is used to specify a location in the environment, and the voice command is used to specify an action to be taken by the robot.

In an embodiment, the image data includes a non-visible marking made by a user, the non-visible marking acting as the triggering action. In a further embodiment, the non-visible marking comprises an infrared-visible ink marking. In another embodiment, the non-visible marking is a symbol, and to initiate the robot operation, the operation database interface 306 is used to access a lookup table and search for the symbol to identify a corresponding robot operation.

In an embodiment, the trigger detection unit 304 is to obtain a geolocation associated with the triggering action and the transceiver 308 is to initiate the robot operation to be performed at the geolocation. In a further embodiment, the geolocation is obtained from a device operated by a user performing the triggering action. In another embodiment, the geolocation is obtained from a gesture performed by the user, the gesture captured in the image data.

Figure 4:
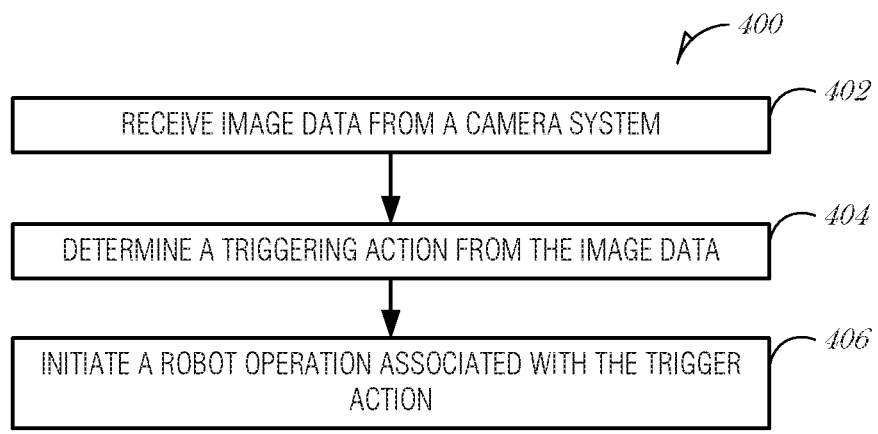
FIG. 4 is a flowchart illustrating a method for providing a vision-based robot control system, according to an embodiment.

FIG. 4 is a flowchart illustrating a method 400 for providing a vision-based robot control system, according to an embodiment. At block 402, image data from a camera system is received at a processor-based robot control system.

At block 404, a triggering action is determined from the image data.

At block 406, a robot operation associated with the triggering action is initiated. In an embodiment, initiating the robot operation comprises transmitting a command sequence to a robot over a wireless network. Various networks may be used, such as Bluetooth, Wi-Fi, or the like.

In an embodiment, the robot operation comprises a cleaning task. Other robotic tasks are understood to be within the scope of this disclosure.

In an embodiment, receiving the image data comprises receiving an image of a user performing a gesture. In such an embodiment, determining the triggering action comprises determining the triggering action corresponding to the gesture. The gesture may be any type of gesture, as discussed above, and may include actions such as pointing, tapping one's foot, or other similar gestures. Thus, in an embodiment, the gesture comprises pointing to a location in an environment. In another embodiment, the gesture comprises tapping a foot on a location in an environment. In such embodiments, the triggering action is the gesture and the robot operation comprises performing extra cleaning at the location in the environment.

In an embodiment, the image data includes a gesture performed by a user. The user may contemporaneously issue a voice command to accompany the gesture and provide further parameters on the gesture command. Thus, in such an embodiment, the method 400 includes receiving a voice command issued by the user. Determining the triggering action then comprises using the gesture and the voice command to determine the triggering action.

In an embodiment, the gesture is used to specify a location in the environment, and the voice command is used to specify an action to be taken by the robot.

In an embodiment, the image data includes a non-visible marking made by a user, the non-visible marking acting as the triggering action. The non-visible marking may be infrared ink, as described above. Thus, in an embodiment, the non-visible marking comprises an infrared-visible ink marking. Various words, symbols, or other indicia may be made with such ink and the robot control system may decipher the indicia and determine the meaning of the command Thus, in an embodiment, the non-visible marking is a symbol, and initiating the robot operation comprises searching a lookup table for the symbol to identify a corresponding robot operation. The lookup table may be administered by the user, or by an administrative person, such as the manufacturer or provider of the robot and related services.

In an embodiment, the method 400 includes obtaining a geolocation associated with the triggering action and initiating the robot operation to be performed at the geolocation. The geolocation may be obtained in various ways, such as with a mobile device that is able to determine a global positioning system (GPS) location (or similar), or by a camera system able to track and determine the user's location when the user performs a gesture or leaves a marking. Thus, in an embodiment, the geolocation is obtained from a device operated by a user performing the triggering action. In another embodiment, the geolocation is obtained from a gesture performed by the user, the gesture captured in the image data.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 5:
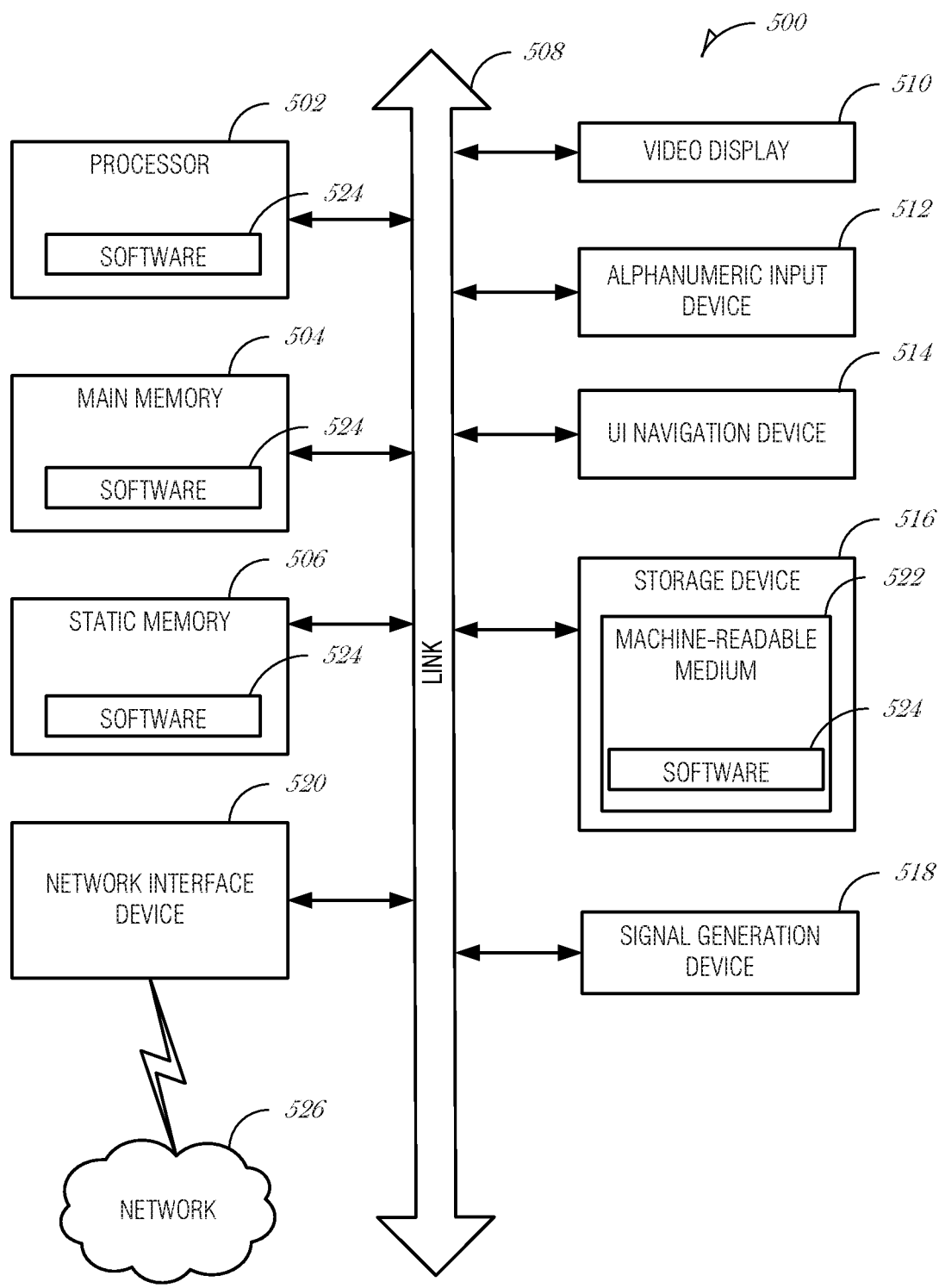
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, gyrometer, magnetometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a vision-based robot control system, the system comprising: a camera system interface to receive image data from a camera system; a trigger detection unit to determine a triggering action from the image data; and a transceiver to initiate a robot operation associated with the triggering action.

In Example 2, the subject matter of Example 1 optionally includes wherein to receive the image data, the camera system interface is to receive an image of a user performing a gesture; and wherein to determine the triggering action, the trigger detection unit is to determine the triggering action corresponding to the gesture.

In Example 3, the subject matter of Example 2 optionally includes wherein the gesture comprises pointing to a location in an environment.

In Example 4, the subject matter of any one or more of Examples 2-3 optionally include wherein the gesture comprises tapping a foot on a location in an environment.

In Example 5, the subject matter of any one or more of Examples 3-4 optionally include or 4, wherein the triggering action is the gesture and the robot operation comprises performing extra cleaning at the location in the environment.

In Example 6, the subject matter of any one or more of Examples 1-5 optionally include wherein the image data includes a gesture performed by a user, and wherein the trigger detection unit is to receive a voice command issued by the user and determine the triggering action using the gesture and the voice command.

In Example 7, the subject matter of Example 6 optionally includes wherein the gesture is used to specify a location in the environment, and wherein the voice command is used to specify an action to be taken by the robot.

In Example 8, the subject matter of any one or more of Examples 1-7 optionally include wherein the image data includes a non-visible marking made by a user, the non-visible marking acting as the triggering action.

In Example 9, the subject matter of Example 8 optionally includes wherein the non-visible marking comprises an infrared-visible ink marking.

In Example 10, the subject matter of any one or more of Examples 8-9 optionally include wherein the non-visible marking is a symbol, and to initiate the robot operation, an operation database interface is used to access a lookup table and search for the symbol to identify a corresponding robot operation.

In Example 11, the subject matter of any one or more of Examples 1-10 optionally include wherein the trigger detection unit is to obtain a geolocation associated with the triggering action; and wherein the transceiver is to initiate the robot operation to be performed at the geolocation.

In Example 12, the subject matter of Example 11 optionally includes wherein the geolocation is obtained from a device operated by a user performing the triggering action.

In Example 13, the subject matter of any one or more of Examples 11-12 optionally include wherein the geolocation is obtained from a gesture performed by the user, the gesture captured in the image data.

In Example 14, the subject matter of any one or more of Examples 1-13 optionally include wherein to initiate the robot operation, the transceiver is to transmit a command sequence to a robot over a wireless network.

In Example 15, the subject matter of any one or more of Examples 1-14 optionally include wherein the robot operation comprises a cleaning task.

Example 16 is a method of providing a vision-based robot control system, the method comprising: receiving, at a processor-based robot control system, image data from a camera system; determining a triggering action from the image data; and initiating a robot operation associated with the triggering action.

In Example 17, the subject matter of Example 16 optionally includes wherein receiving the image data comprises receiving an image of a user performing a gesture; and wherein determining the triggering action comprises determining the triggering action corresponding to the gesture.

In Example 18, the subject matter of Example 17 optionally includes wherein the gesture comprises pointing to a location in an environment.

In Example 19, the subject matter of any one or more of Examples 17-18 optionally include wherein the gesture comprises tapping a foot on a location in an environment.

In Example 20, the subject matter of any one or more of Examples 18-19 optionally include or 19, wherein the triggering action is the gesture and the robot operation comprises performing extra cleaning at the location in the environment.

In Example 21, the subject matter of any one or more of Examples 16-20 optionally include wherein the image data includes a gesture performed by a user, and wherein the method comprises receiving a voice command issued by the user; and wherein determining the triggering action comprises using the gesture and the voice command to determine the triggering action.

In Example 22, the subject matter of Example 21 optionally includes wherein the gesture is used to specify a location in the environment, and wherein the voice command is used to specify an action to be taken by the robot.

In Example 23, the subject matter of any one or more of Examples 16-22 optionally include wherein the image data includes a non-visible marking made by a user, the non-visible marking acting as the triggering action.

In Example 24, the subject matter of Example 23 optionally includes wherein the non-visible marking comprises an infrared-visible ink marking.

In Example 25, the subject matter of any one or more of Examples 23-24 optionally include wherein the non-visible marking is a symbol, and wherein initiating the robot operation comprises searching a lookup table for the symbol to identify a corresponding robot operation.

In Example 26, the subject matter of any one or more of Examples 16-25 optionally include obtaining a geolocation associated with the triggering action; and initiating the robot operation to be performed at the geolocation.

In Example 27, the subject matter of Example 26 optionally includes wherein the geolocation is obtained from a device operated by a user performing the triggering action.

In Example 28, the subject matter of any one or more of Examples 26-27 optionally include wherein the geolocation is obtained from a gesture performed by the user, the gesture captured in the image data.

In Example 29, the subject matter of any one or more of Examples 16-28 optionally include wherein initiating the robot operation comprises transmitting a command sequence to a robot over a wireless network.

In Example 30, the subject matter of any one or more of Examples 16-29 optionally include wherein the robot operation comprises a cleaning task.

Example 31 is at least one machine-readable medium including instructions, which when executed by a machine, cause the machine to perform operations of any of the methods of Examples 16-30.

Example 32 is an apparatus comprising means for performing any of the methods of Examples 16-30.

Example 33 is an apparatus for providing a vision-based robot control system, the apparatus comprising: means for receiving, at a processor-based robot control system, image data from a camera system; means for determining a triggering action from the image data; and means for initiating a robot operation associated with the triggering action.

In Example 34, the subject matter of Example 33 optionally includes wherein the means for receiving the image data comprise means for receiving an image of a user performing a gesture; and wherein the means for determining the triggering action comprise means for determining the triggering action corresponding to the gesture.

In Example 35, the subject matter of Example 34 optionally includes wherein the gesture comprises pointing to a location in an environment.

In Example 36, the subject matter of any one or more of Examples 34-35 optionally include wherein the gesture comprises tapping a foot on a location in an environment.

In Example 37, the subject matter of any one or more of Examples 35-36 optionally include or 36, wherein the triggering action is the gesture and the robot operation comprises performing extra cleaning at the location in the environment.

In Example 38, the subject matter of any one or more of Examples 33-37 optionally include wherein the image data includes a gesture performed by a user, and wherein the apparatus comprises means for receiving a voice command issued by the user; and wherein the means for determining the triggering action comprise means for using the gesture and the voice command to determine the triggering action.

In Example 39, the subject matter of Example 38 optionally includes wherein the gesture is used to specify a location in the environment, and wherein the voice command is used to specify an action to be taken by the robot.

In Example 40, the subject matter of any one or more of Examples 33-39 optionally include wherein the image data includes a non-visible marking made by a user, the non-visible marking acting as the triggering action.

In Example 41, the subject matter of Example 40 optionally includes wherein the non-visible marking comprises an infrared-visible ink marking.

In Example 42, the subject matter of any one or more of Examples 40-41 optionally include wherein the non-visible marking is a symbol, and wherein the means for initiating the robot operation comprise means for searching a lookup table for the symbol to identify a corresponding robot operation.

In Example 43, the subject matter of any one or more of Examples 33-42 optionally include means for obtaining a geolocation associated with the triggering action; and means for initiating the robot operation to be performed at the geolocation.

In Example 44, the subject matter of Example 43 optionally includes wherein the geolocation is obtained from a device operated by a user performing the triggering action.

In Example 45, the subject matter of any one or more of Examples 43-44 optionally include wherein the geolocation is obtained from a gesture performed by the user, the gesture captured in the image data.

In Example 46, the subject matter of any one or more of Examples 33-45 optionally include wherein the means for initiating the robot operation comprise means for transmitting a command sequence to a robot over a wireless network.

In Example 47, the subject matter of any one or more of Examples 33-46 optionally include wherein the robot operation comprises a cleaning task.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A vision-based robot control system, the system comprising:
   a camera system interface to receive image data from a camera system;
   a trigger detection unit to determine a triggering action from the image data; and
   a transceiver to initiate a robot operation associated with the triggering action.

2. The system of claim 1, wherein to receive the image data, the camera system interface is to receive an image of a user performing a gesture; and
   wherein to determine the triggering action, the trigger detection unit is to determine the triggering action corresponding to the gesture.

3. The system of claim 2, wherein the gesture comprises pointing to a location in an environment.

4. The system of claim 2, wherein the gesture comprises tapping a foot on a location in an environment.

5. The system of claim 4, wherein the triggering action is the gesture and the robot operation comprises performing extra cleaning at the location in the environment.

6. The system of claim 1, wherein the image data includes a gesture performed by a user, and wherein the trigger detection unit is to receive a voice command issued by the user and determine the triggering action using the gesture and the voice command.

7. The system of claim 6, wherein the gesture is used to specify a location in the environment, and wherein the voice command is used to specify an action to be taken by the robot.

8. The system of claim 1, wherein the image data includes a non-visible marking made by a user, the non-visible marking acting as the triggering action.

9. The system of claim 8, wherein the non-visible marking comprises an infrared-visible ink marking.

10. The system of claim 8, wherein the non-visible marking is a symbol, and to initiate the robot operation, an operation database interface is used to access a lookup table and search for the symbol to identify a corresponding robot operation.

11. The system of claim 1, wherein the trigger detection unit is to obtain a geolocation associated with the triggering action; and wherein the transceiver is to initiate the robot operation to be performed at the geolocation.

12. The system of claim 11, wherein the geolocation is obtained from a device operated by a user performing the triggering action.

13. The system of claim 11, wherein the geolocation is obtained from a gesture performed by the user, the gesture captured in the image data.

14. The system of claim 1, wherein to initiate the robot operation, the transceiver is to transmit a command sequence to a robot over a wireless network.

15. The system of claim 1, wherein the robot operation comprises a cleaning task.

16. A method of providing a vision-based robot control system, the method comprising:
   receiving, at a processor-based robot control system, image data from a camera system;
   determining a triggering action from the image data; and
   initiating a robot operation associated with the triggering action.

17. The method of claim 16, wherein receiving the image data comprises receiving an image of a user performing a gesture; and
   wherein determining the triggering action comprises determining the triggering action corresponding to the gesture.

18. The method of claim 17, wherein the gesture comprises pointing to a location in an environment.

19. The method of claim 17, wherein the gesture comprises tapping a foot on a location in an environment.

20. The method of claim 19, wherein the triggering action is the gesture and the robot operation comprises performing extra cleaning at the location in the environment.

21. At least one machine-readable medium including instructions, which when executed by a machine, cause the machine to
   receive, at a processor-based robot control system, image data from a camera system;
   determine a triggering action from the image data; and
   initiate a robot operation associated with the triggering action.

22. The at least one machine-readable medium of claim 21, wherein the instructions to receive the image data comprise instructions to receive an image of a user performing a gesture; and
   wherein the instructions to determine the triggering action comprise instructions to determine the triggering action corresponding to the gesture.

23. The at least one machine-readable medium of claim 22, wherein the gesture comprises pointing to a location in an environment.

24. The at least one machine-readable medium of claim 22, wherein the gesture comprises tapping a foot on a location in an environment.

25. The at least one machine-readable medium of claim 24, wherein the triggering action is the gesture and the robot operation comprises performing extra cleaning at the location in the environment.

* * * * *